United States Patent
Kawano et al.

(10) Patent No.: US 8,542,274 B2
(45) Date of Patent: Sep. 24, 2013

(54) WIDE FIELD MICROSCOPIC IMAGING SYSTEM AND METHOD

(75) Inventors: Yoshihiro Kawano, Bethlehem, PA (US); Lorne D. Davies, Macungie, PA (US)

(73) Assignee: Olympus America Inc., Center Valley, PA (US)

( * ) Notice: Subject to any disclaimer, the term of this patent is extended or adjusted under 35 U.S.C. 154(b) by 334 days.

(21) Appl. No.: 12/906,411

(22) Filed: Oct. 18, 2010

(65) Prior Publication Data

US 2012/0092477 A1     Apr. 19, 2012

(51) Int. Cl.
*H04N 13/00*     (2006.01)

(52) U.S. Cl.
USPC .......................................................... 348/79

(58) Field of Classification Search
USPC .......................................................... 348/79
See application file for complete search history.

(56) References Cited

U.S. PATENT DOCUMENTS

| | | | |
|---|---|---|---|
| 5,249,077 A * | 9/1993 | Laronga et al. | 359/385 |
| 6,031,930 A | 2/2000 | Bacus et al. | |
| 6,101,265 A | 8/2000 | Bacus et al. | |
| 6,272,235 B1 | 8/2001 | Bacus et al. | |
| 6,339,498 B1 * | 1/2002 | Nishida et al. | 359/361 |
| 6,396,941 B1 | 5/2002 | Bacus et al. | |
| 6,466,690 B2 | 10/2002 | Bacus et al. | |
| 7,141,802 B2 * | 11/2006 | Takeyama et al. | 250/458.1 |
| 7,436,591 B2 * | 10/2008 | Mizusawa | 359/388 |
| 7,596,249 B2 * | 9/2009 | Bacus et al. | 382/128 |
| 7,792,338 B2 | 9/2010 | Bacus et al. | |
| 7,933,066 B2 * | 4/2011 | Steffen et al. | 359/390 |
| 2004/0156102 A1 * | 8/2004 | Boehm et al. | 359/388 |
| 2004/0196457 A1 * | 10/2004 | Aono et al. | 356/318 |
| 2009/0160994 A1 * | 6/2009 | Ganser | 348/333.01 |

* cited by examiner

*Primary Examiner* — David Czekaj
*Assistant Examiner* — MD Haque
(74) *Attorney, Agent, or Firm* — Meagher Emanuel Laks Goldberg & Bovino, LLP

(57) ABSTRACT

A wide field microscopic image acquisition apparatus and method are disclosed. The apparatus is configured to acquire images of a specimen on a microscope slide and includes first and second illuminators each having unique illumination characteristics. The apparatus includes a microscope imaging system with an imaging device, an objective lens and a stage configured to digitally acquire a plurality of images of the specimen using the first and second illuminators. A controller is configured to automatically control the microscope imaging system and acquire the plurality of images of the specimen using the first and second illuminators. The first and second illuminators can be bright field, dark field or fluorescent illuminators.

28 Claims, 15 Drawing Sheets

WIDE FIELD MICROSCOPIC IMAGING SYSTEM AND METHOD

FIELD OF INVENTION

This application is related to microscopic imaging systems and more particularly to microscopic imaging systems configured to acquire wide field images of specimens using bright field, dark field and fluorescent illumination techniques.

BACKGROUND

Wide field microscope images can be acquired using an automated microscope, a whole slide microscope or virtual slide microscope. Such slide scanning systems are available from a variety of sources. For example, the Olympus VS110 (Olympus America Inc.) is a microscope-based slide scanning system configured for acquiring microscopic images and storing them as wide field microscopic image(s) (e.g., the wide field microscope images can be whole slide images (WSI) or virtual slide images). Microscope slides can be scanned (i.e., image data is acquired) at a variety of magnifications and numerical apertures (e.g., 20×/0.75 N.A., 40×/0.95 N.A., 60×/1.1 N.A, 100×, 1.4 N.A. . . . ). Such systems can perform tissue detection prior to scanning. This allows the system to identify specific areas of the slide having a portion of a specimen to be imaged. The system can be fitted with a slide loader and a barcode reader. The system can perform automated slide scanning and can also associate the slide images with supporting data (e.g., bar coded ID information) for record keeping purposes. Such systems can also capture multiple images at multiple focal planes (z-planes) allowing for the formation of WSI files with virtual focusing support. WSI information can be distributed via a data network allowing easy access to the WSI information from a variety of physical locations. WSI viewing is typically accomplished with a web browser and plug-in or dedicated viewing program.

Typical microscopic slide scanning systems are optimized to use a single illumination type. For example, if a stained specimen is used then bright field illumination may be desired. If an unstained specimen is used then dark field illumination may be preferable. In some cases, the specimen may be stained with a fluorescent dye. In this case, the specimen is illuminated with light of a specific wavelength. Current systems require user intervention to change among the variety of available illuminators. It would be desirable to provide an automated wide field microscopic slide scanning system that can be automatically configured to operate with multiple illuminators.

SUMMARY

A wide field microscopic image acquisition apparatus and method are disclosed. The apparatus is configured to acquire images of a specimen on a microscope slide and includes first and second illuminators each having unique illumination characteristics. The apparatus includes a microscope imaging system with an imaging device, an objective lens and a stage configured to digitally acquire a plurality of images of the specimen using the first and second illuminators. A controller is configured to automatically control the microscope imaging system and acquire the plurality of images of the specimen using the first and second illuminators.

The first and second illuminators can be bright field, dark field or fluorescent illuminators. The controller can be configured to acquire a plurality of X-Y images of the specimen using the first illuminator prior to switching to the second illuminator. In the alternative, the controller can be configured to acquire the plurality images of the specimen using the first illuminator prior to moving the specimen in an X-Y direction with respect to the objective lens.

The controller can be configured to generate a focal map of the specimen. In one example, the first illuminator is a dark field illuminator and the second illuminator is a fluorescent illuminator. The controller can be configured to generate a dark field focal map of the specimen using the dark field illuminator and acquire images of the specimen using the fluorescent illuminator based on the dark field focal map.

The apparatus can also include a condenser and the controller can be configured to adjust the condenser to minimize light transmitted along the imager light path. For example, the condenser can include a pivot and the controller can be configured to move the condenser via the pivot to minimize light transmitted along the light path.

The controller can be configured to digitally acquire a plurality of Z images of the specimen. The controller can also be configured to acquire a plurality of images of the specimen at multiple magnifications. The controller can be further configured to save a data structure of images of the specimen.

The dark field illuminator can include a first light source having a first spectral output and a second light source having a second spectral output. The first and second light sources can be configured to direct light into an edge of the microscope slide. The dark field illuminator can also include a light guide configured to collimate light originating from the dark field illuminator. The dark field illuminator can also include a plurality of individual light sources arranged in array. The light guide can be formed with upper and lower portions, configured to collimate light originating from the individual light sources. The individual light sources can be configured to be selectively energized. The dark field illuminator can also include a plurality mounting units configured to hold a plurality of unpackaged individual light sources.

BRIEF DESCRIPTION OF THE DRAWINGS

A more detailed understanding may be had from the following description, given by way of example in conjunction with the accompanying drawings wherein.

DETAILED DESCRIPTION

Figure 1:
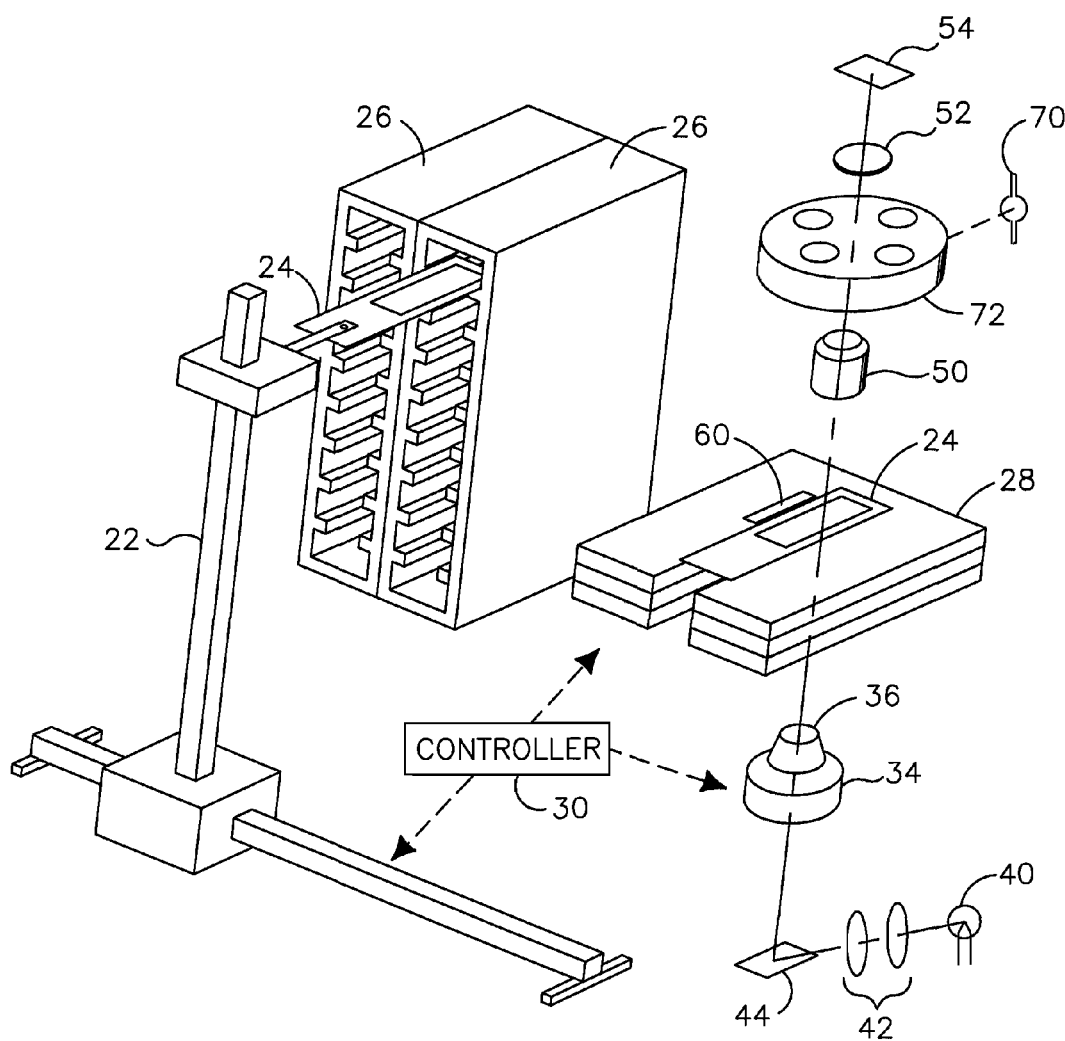
FIG. 1 shows a diagram of various components used in an example automated high magnification, wide field imaging system for observing multiple transparent and/or stained specimens.

FIG. 1 shows a partial diagram of various components used in an example automated, high magnification, wide field imaging system 20 for observing multiple transparent and/or stained microscopic specimens. For purposes of clarity, only major system components are shown. System 20 includes a slide loader 22 configured to manipulate one or more slides 24 that can be stored in one or more storage units or cassettes 26. In order to view a slide 24, the slide loader 22 is configured to move the slide 24 between the cassette 26 and a microscope stage 28. In this example, the stage 28 is shown as a three plate motorized stage. It should be understood that other types of stages could be used. The slide loader 22, stage 28 and other system components can be controlled by a digital controller shown generally by block 30.

The remaining elements in FIG. 1 relate to components disposed along a microscope light path 32. It should be understood that such components may be located in one or more housings. A condenser 34 is provided below the stage 28. The condenser 34 may include one or more lenses 36. The condenser 34 is generally used to focus light on the specimen located on slide 24. A bright field illuminator 40 generally provides light along light path 32 for bright field illumination. Bright field illuminator 40 can include an incandescent lamp, halogen lamp, xenon lamp, arc lamp, light emitting diode (LED) or any other light source in a variety of wattages depending on the light output and spectrum desired. One or more supplemental lenses 42 may be used to focus the light from bright field illuminator 40. A mirror 44 can be used to reflect light from the bright field illuminator 40 along the light path 32. It should be understood that a variety of mounting hardware can be used to accurately position the bright field illuminator 40 and any intervening lenses with respect to the condenser 34 and light path 32.

An objective lens 50 is disposed above the slide 24. It should be understood that the objective lens 50 is generally coupled to a focusing mechanism (not shown) to move the objective lens 50 with respect to the slide 24. It is also understood that controller 30 can be configured to adjust the focusing mechanism. A tube lens 52 can also be disposed along light path 32. An imaging device 54 is also disposed along light path 32. The imaging device can be a charge-coupled device (CCD), complementary metal-oxide-semiconductor (CMOS) device or any other image sensor operable to capture a digital image of a specimen. Such devices can have a variety of physical implementations including a two-dimensional array or line scanner (including time delay and integration devices). It should be understood that the imaging device has a plurality of pixels (the actual number of pixels depending on the desired resolution). It is also understood that the imaging device can be configured to capture color images. Accordingly, multiple image sensors may be incorporated into the imaging device (e.g., one image sensor for each primary color—red, green and blue).

FIG. 1 also includes light sources for dark field and fluorescent illumination. A dark field illuminator is generally shown by block 60 as discussed in more detail below. A fluorescent illuminator is shown generally by block 70. The fluorescent illuminator can be coupled to the light path 32 via a filter unit 72. The filter unit 72 can include an excitation filter, emission filter and/or a dichroic mirror that is operable to selectively pass light of a small range of colors while reflecting light of other colors. This allows fluorescent illuminator 70 to illuminate a specimen on slide 24 with light of a first wavelength and pass light emitted from the specimen at a second wavelength to the imaging device 54. The fluorescent illuminator 70 can be a metal halide lamp, light emitting diode (LED), Laser diode or any other light source operable to emit the desired wavelength or spectrum of light. It should be understood that one or more ocular lenses (not shown) can also be included so that an operator can view the specimen.

Imaging device 54, stage 28, focusing mechanism, and the various light sources are generally coupled to controller 30. The controller 30 is configured to control the acquisition of images by manipulating the stage, light sources and imaging device 54. It should be understood that images can be acquired in an X-Y fashion or in strips. It is also understood that images can be non-overlapping or overlapping. In general, the controller 30 is configured to generate one or more output file(s) containing image data for the specimen as discussed in more detail below.

Figure 2:
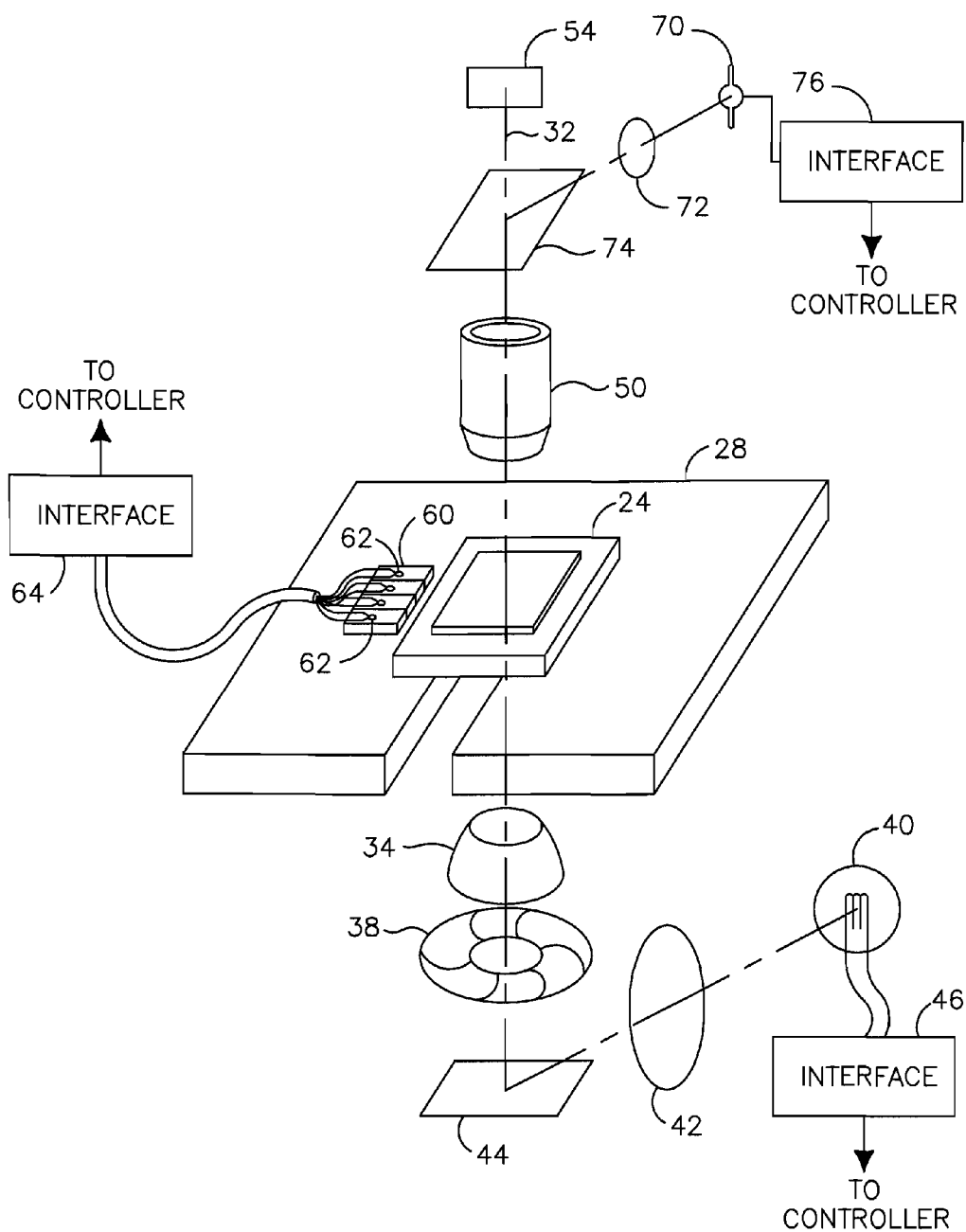
FIG. 2 shows a more detailed layout of various optical components used in an example automated high magnification, wide field imaging system.

FIG. 2 shows a more detailed layout of various optical components used in an automated high magnification, wide field imaging system. A condenser 34 is provided below the stage 28. In this example, an aperture stop 38 is disposed between the bright field illuminator 40 and the condenser 34. The aperture stop 38 can be controlled via controller 30 to adjust the amount of light that reaches the specimen on slide 24. Bright field illuminator 40 is coupled to the controller 30 via interface 46. Interface 46 generally takes converts digital information from controller 30 to a suitable drive signal for the bright field illuminator 40. It should be understood that interface 46 may require separate power connections and may be integrated into controller 30 or may be a separate device.

A dark field illuminator is generally shown by block 60. The dark field illuminator 60 is mechanically coupled to the stage 28 so that it remains in a fixed relationship with respect to the slide 24. The dark field illuminator 60 is composed of one or more individual light sources 62 configured to direct light into the side of the slide 24. In this example, the light sources 62 are light emitting diodes (LED). The LEDs are selected depending on the desired light output level and spectrum. It should be understood that a variety of LEDs can be used without departing from the scope of this disclosure. The dark field illuminator 60 is electrically coupled to the controller 30 via interface 64. Interface 64 converts digital information from controller 30 to a suitable drive signal for the dark field illuminator 60. It should be understood that interface 64 may require separate power connections and may be integrated into controller 30 or may be a separate device.

In this example, fluorescent illuminator 70 is coupled to the light path 32 via a filter 72 and a dichroic mirror 74. This allows fluorescent illuminator 70 to illuminate a specimen on slide 24 with light of a first wavelength and pass light emitted from the specimen at a second wavelength to the imaging device 54. Fluorescent illuminator 70 is electrically coupled to the controller 30 via interface 76. Interface 76 converts digital information from controller 30 to a suitable drive signal for the fluorescent illuminator 70. It should be understood that interface 76 may require separate power connections and may be integrated into controller 30 or may be a separate device.

Figure 3:
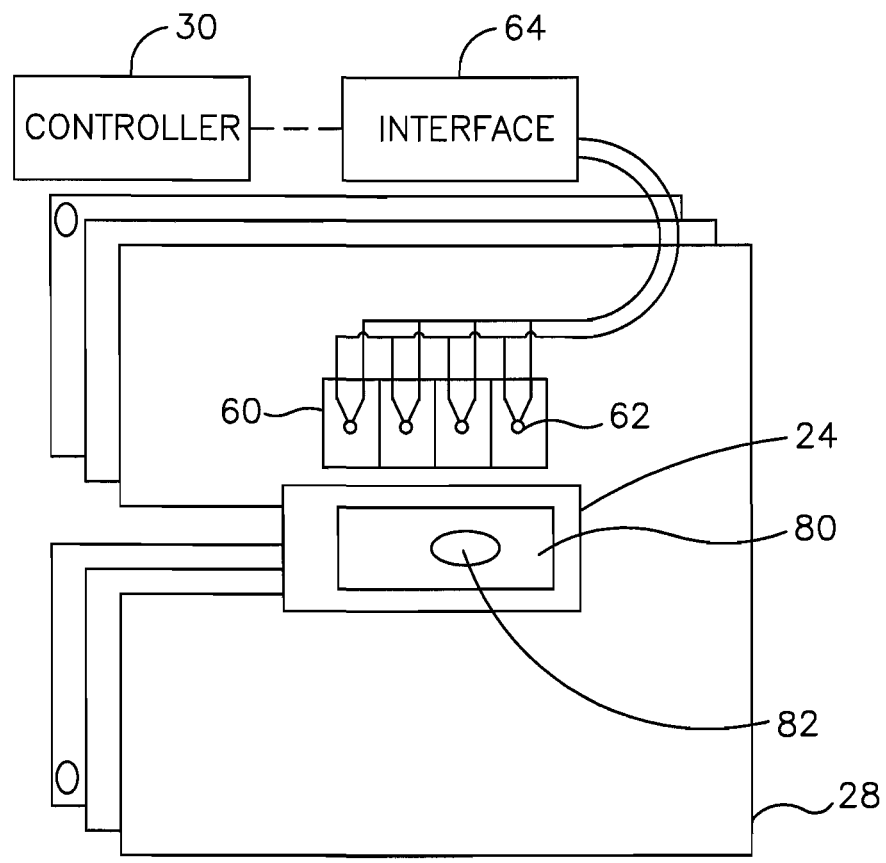
FIG. 3 shows a detailed view of the connections to the dark field illuminator.

FIG. 3 shows a detailed view of the connections to the dark field illuminator 60. The dark field illuminator 60 is mechanically coupled to the stage 28 so that it remains in a fixed relationship with respect to the slide 24. In this example, the slide 24 is show with cover glass 80 and specimen 82. The dark field illuminator 60 is composed of one or more individual light sources 62 (e.g., LEDs) configured to direct light into the side of the slide 24. In this example, the light sources 62 are light emitting diodes (LED).

Figure 4:
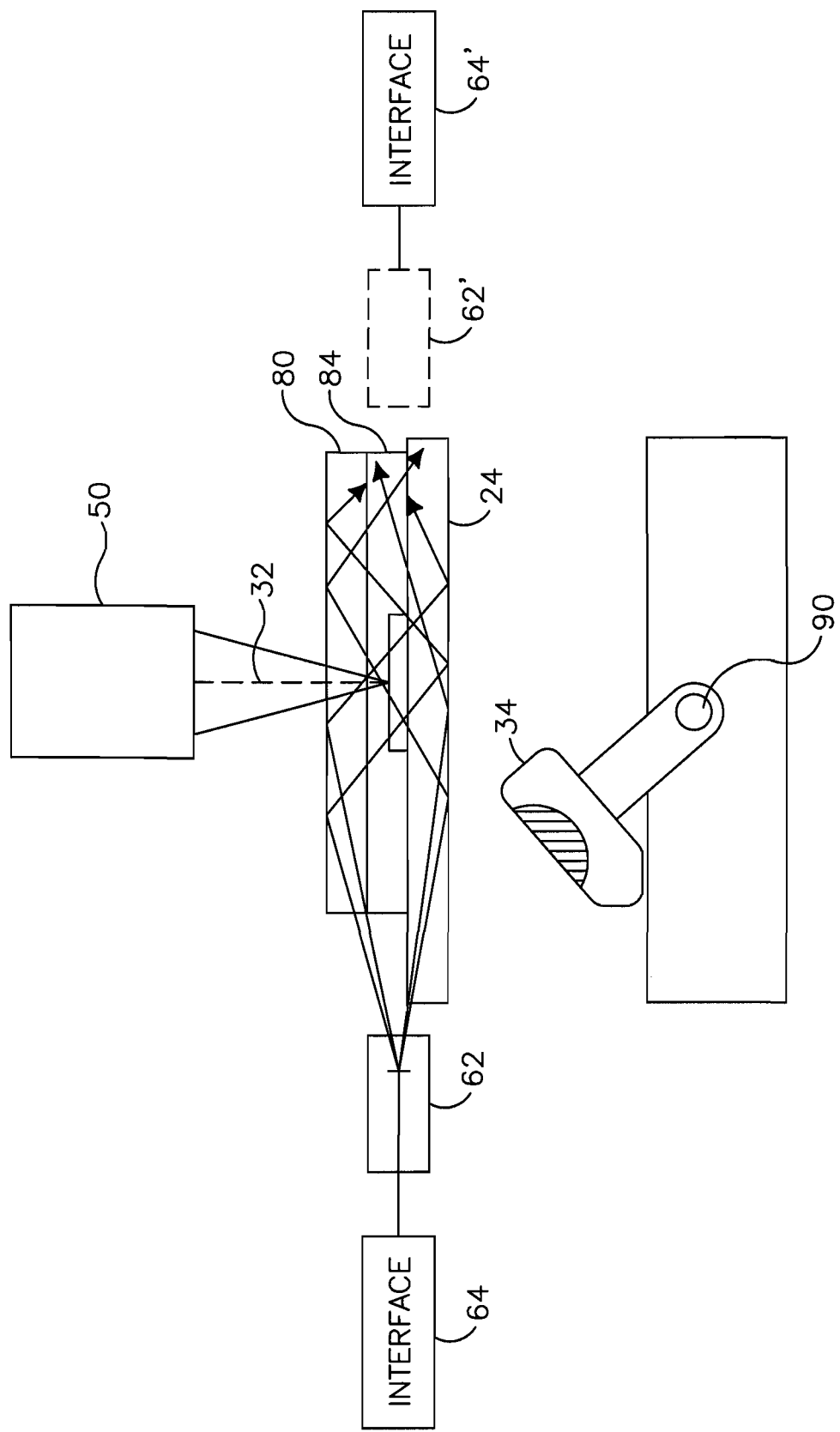
FIG. 4 shows the light path for the dark field illuminator as well as a movable condenser lens.

FIG. 4 shows the light path for the dark field illuminator as well as a movable condenser lens. The dark field illuminator light source 62 directs light into the side of the slide 24. The light is internally reflected between the bottom surface of the slide 24 and the top surface of the cover glass 80. The light passes through the liquid suspension 84 (if any) and indirectly illuminates the specimen 82 (FIG. 3). Additional light sources 62 can be optionally disposed along other sides of a slide as shown by blocks 62' and 64' in dashed lines. Such a configuration can improve dark field illumination since light is directed into the slide from additional angles.

During dark field illumination, it is desirable to eliminate light sources that can leak light along the light path 32. As an initial matter, the bright field illuminator 40 and the fluorescent illuminator 70 should be de-energized. It is also be possible to eliminate additional sources of stray light originating from the condenser 34 area. This can be accomplished in a variety of ways. For example, the aperture stop 38 (FIG. 2) can be closed. The condenser 34 can also be configured with pivot 90 so that the condenser 34 can be displaced from the light path 32.

Figure 5A:
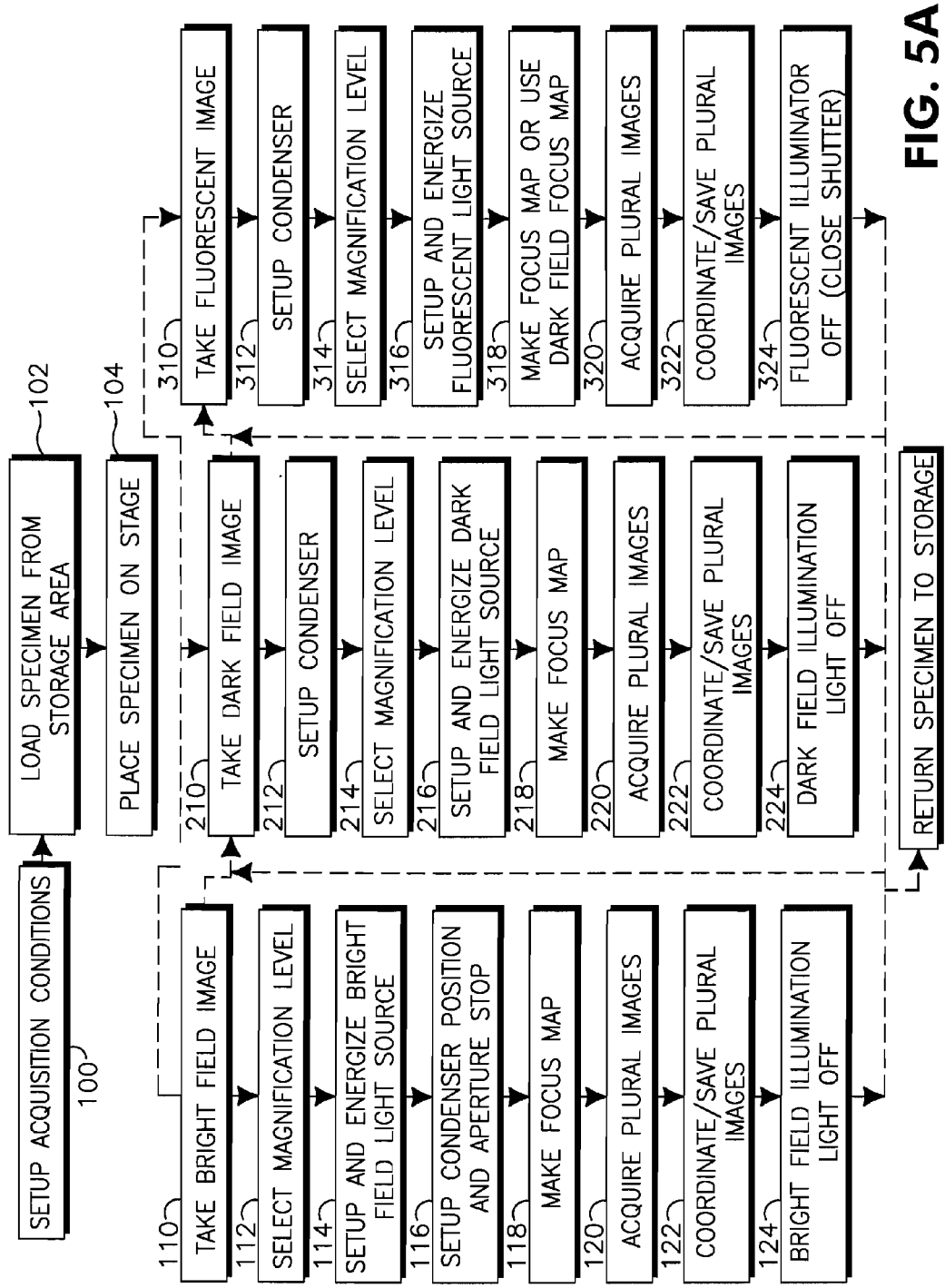
FIG. 5*a* is a flow chart showing operation of an example system using a single illuminator for a given scan area.
Figure 5B:
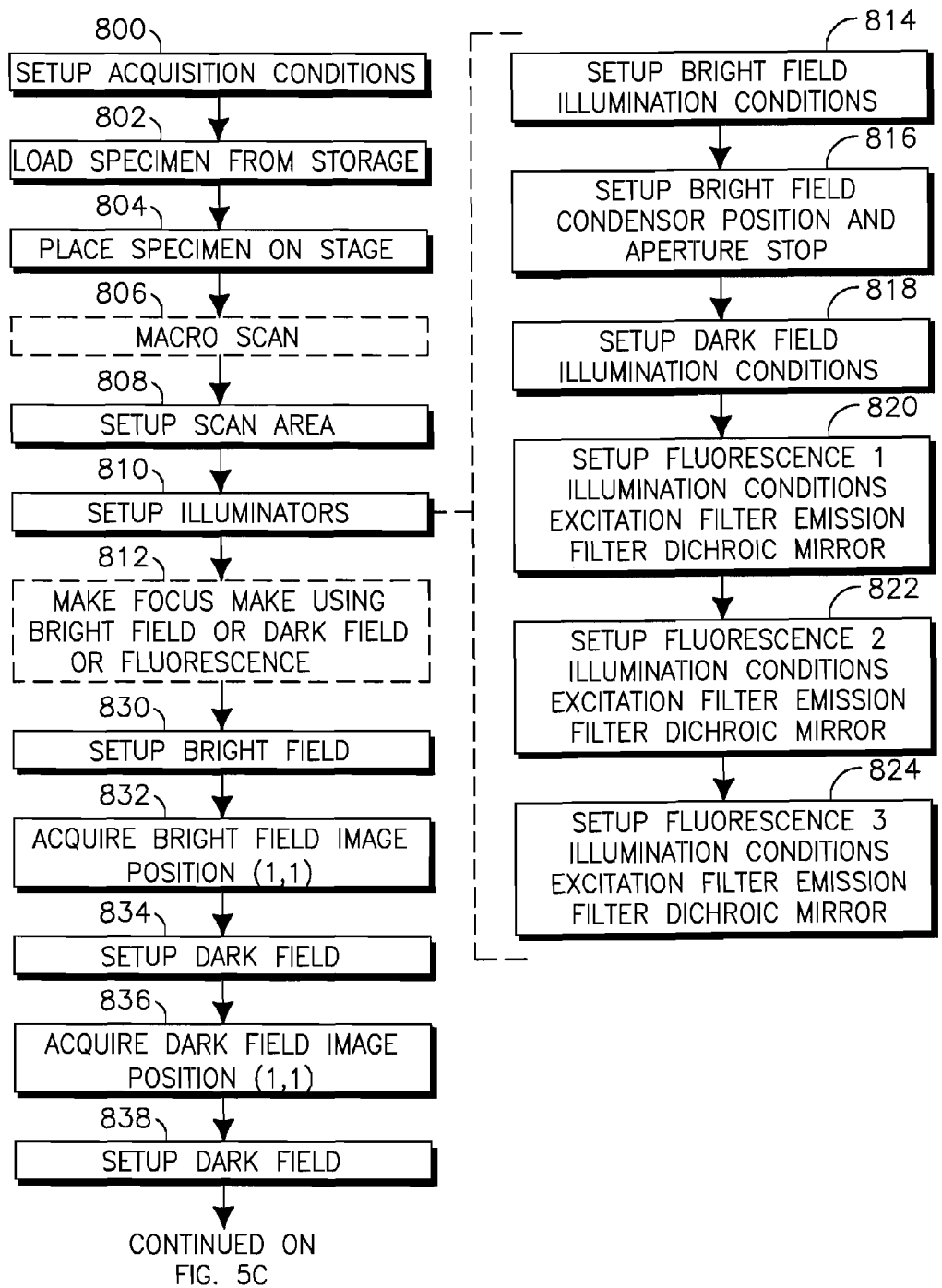
FIGS. 5*b*/5*c* are a flow chart showing operation of a system using multiple illuminators before moving to another lane or acquisition area.
Figure 5C:
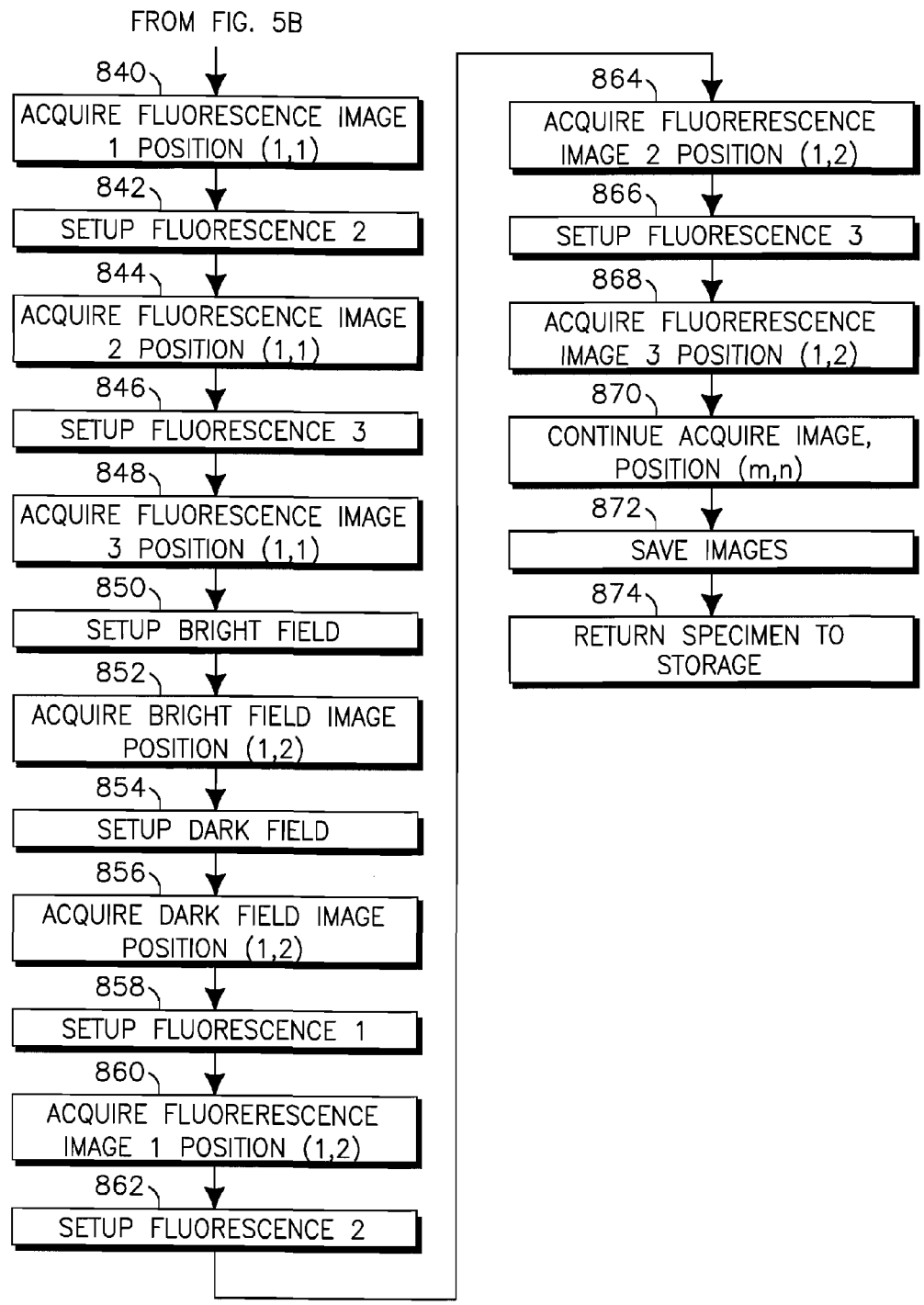

FIGS. 5a-5c are flow charts showing operation of the system. It should be understood that the flowcharts contained herein are illustrative only and that other program entry and exit points, time out functions, error checking routines and the like (not shown) would normally be implemented in typical system software. It is also understood that system software may run continuously after being launched. Accordingly, any beginning and ending blocks are intended to indicate logical beginning and ending points of a portion of code that can be integrated into a main program and called as needed. The order of execution of any of the blocks may also be varied without departing from the scope of this disclosure. Implementation of these aspects is readily apparent and well within the grasp of those skilled in the art based on the disclosure herein.

FIG. 5a shows operation of an example system using a single illuminator for a given scan area. The acquisition conditions are selected as shown in block 100. Acquisition conditions typically include the scan magnification(s), illumination type (e.g., one or more of bright field, dark field, fluorescent), focus options, scan area and the like. Such conditions can be set via a user interface (See 402, FIG. 6). In the alternative, the acquisition conditions can be set based on previously stored information. Once the acquisition conditions are set, the controller 30 can operate the slide loader 22 and retrieve a slide 24 from the cassette 26 as shown by block 102. The slide 24 is placed on the stage 28 as shown by block 104. Depending on the illumination type selected, the scan (image acquisition) process can be carried out beginning with block 110, 210 or 310. It should be understood that scanning can proceed at any of blocks 110, 210 or 310 in any order.

In this example, a bright field image scan is initiated as shown by block 110. Controller 30 can select the desired magnification as shown by block 112 (e.g., select an objective lens 50 with desired magnification). The controller 30 is also configured to energize the bright field illuminator 40 as shown by block 114. The controller 30 can also adjust the illumination level depending on the desired light level. The controller 30 can also adjust the condenser 34 position and select the desired aperture stop as shown by block 116.

Figure 9A:
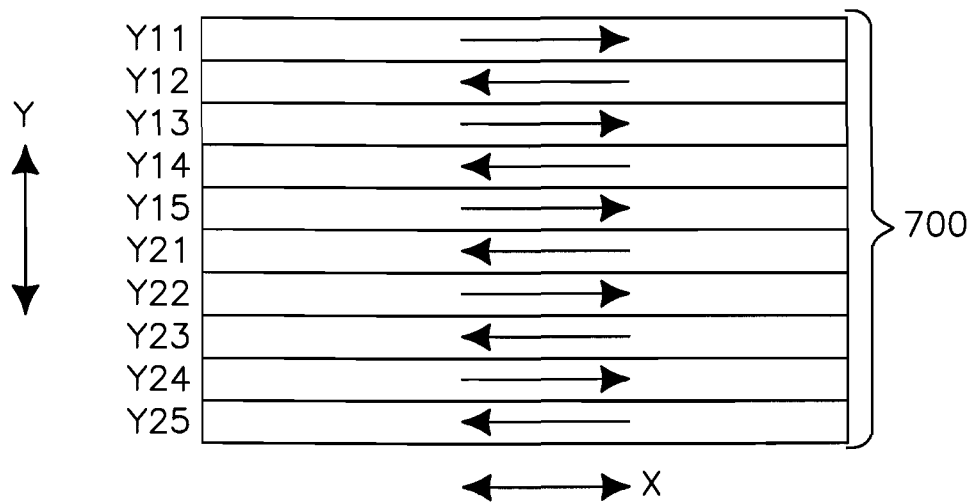
FIGS. 9*a* and 9*b* are diagrams of a scan area divided into a plurality of lanes.

At this point, the system is configured to acquire images. For systems configured with a line scanning image sensor (including time delay and integration devices), image acquisition can proceed as follows. FIG. 9a shows a scan area 700 divided into a plurality of lanes Y11, Y12, Y13, Y14, Y15, Y21, Y22, Y23, Y24 and Y25. Each lane can have a pixel width that generally corresponds to the pixel width of the image sensor (e.g., 2048 pixels). It should be understood that the size of the image on the image sensor depends on the lens used (e.g., magnification and NA) as well as the physical size of the image sensor. FIG. 9a shows a zigzag acquisition pattern. Acquisition begins at lane Y11 and proceeds in the X direction from left to right. Once the scan reaches the end of lane Y11, the specimen is shifted in the Y direction with respect to the objective lens (generally by the width of the image sensor). Acquisition of lane Y12 then proceeds in the X direction from right to left. The pattern is repeated until all lanes are acquired.

Figure 9B:
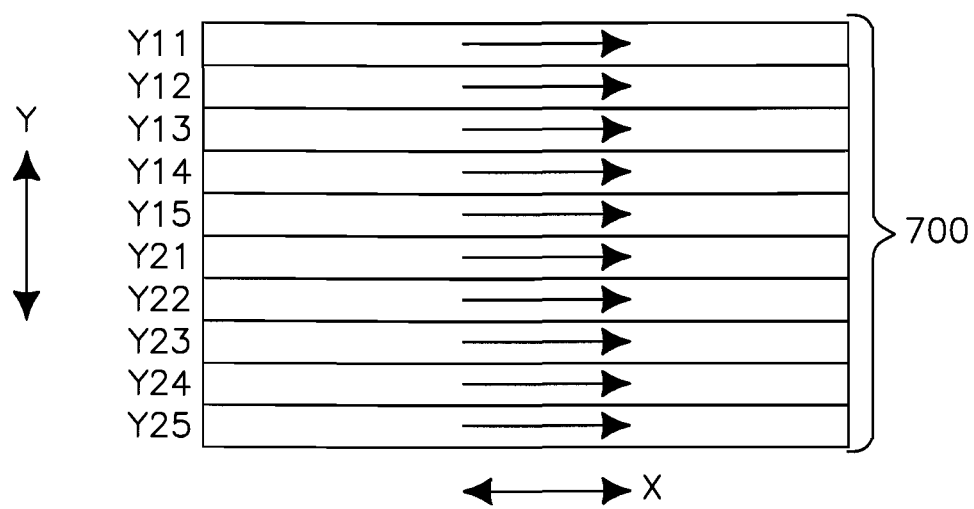

FIG. 9b shows scan 700 again divided into a plurality of lanes Y11, Y12, Y13, Y14, Y15, Y21, Y22, Y23, Y24 and Y25. In this example, a raster scanning pattern is used. Acquisition begins at lane Y11 and proceeds in the X direction from left to right. Once the scan reaches the end of lane Y11, the specimen is shifted in the X direction and in the Y direction with respect to the objective lens. Acquisition of lane Y12 again proceeds from left to right in the X direction. The pattern is repeated until all lanes are acquired.

Regardless of the scan pattern, each lane can be generally acquired as a long strip with pixels that are typically non-overlapping. Each successive lane can be abutting or overlapping with respect to adjacent lanes. It should be understood that other scan patterns are possible without departing from the scope of this disclosure.

Figure 10:
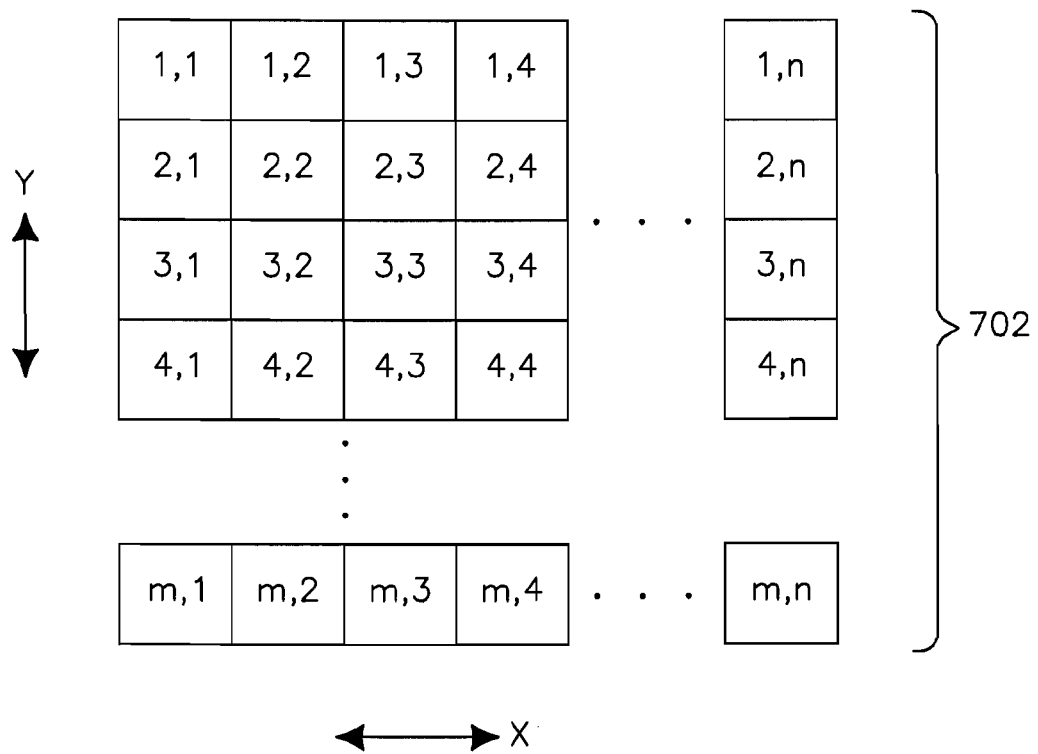
FIG. 10 shows a scan area divided into a plurality of rectangular capture areas or tiles.

For systems configured with a two-dimensional image sensor, image acquisition can proceed as follows. FIG. 10 shows a scan area 702 divided into a plurality of rectangular capture areas or tiles. For purposes of this example the capture areas are labeled in typical X-Y format. In the X direction, the capture areas are labeled 1,1-1,n. In the Y direction the capture areas are labeled 1,1-m,1. The capture area located in the lower right hand corner is labeled m,n. Each capture area can have pixel sizes (length and width) that generally correspond to the pixel sizes of the image sensor (e.g., 1200×1600 pixels). It should be understood that the physical dimensions of each capture area can be determined based on the pixel size of the image sensor and optical characteristics (e.g., magnification, numerical aperture . . . ). The system can acquire images a variety of scan patterns. For example, the system can acquire capture areas moving in the X direction from left to right (1,1, 1,2, 1,3 . . . 1,n) before moving in the Y direction. In the alternative, the system can acquire capture areas moving in the Y direction from top to bottom (1,1, 2,1, 3,1 . . . m,1) before moving in the X direction.

Figure 7:
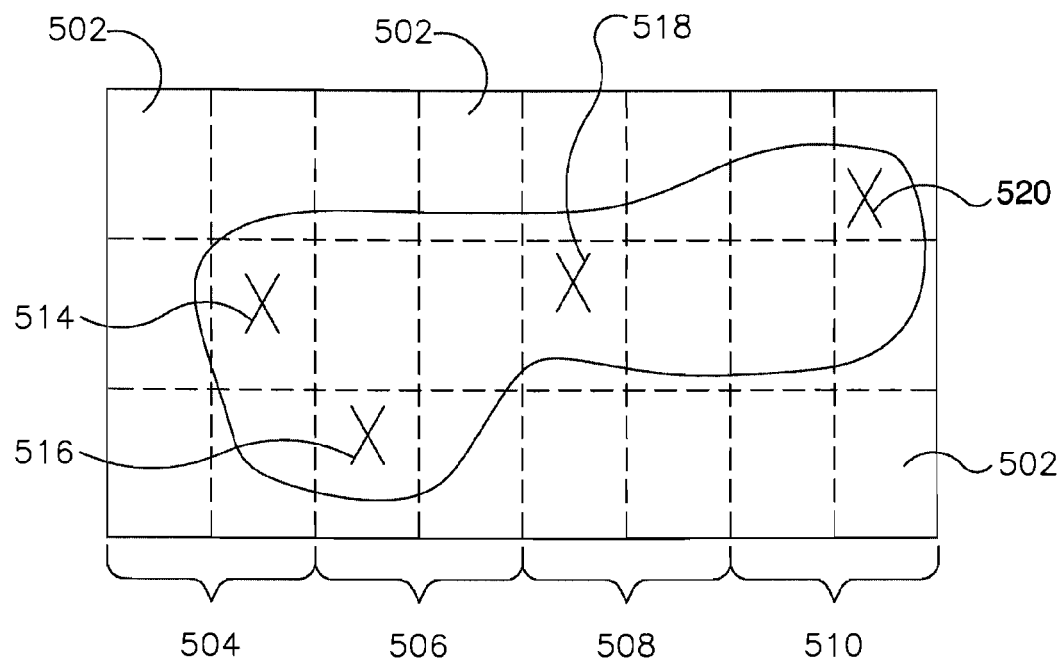
FIG. 7 is a typical view of a specimen with a plurality of capture and focus zones.

A typical specimen will vary in height (Z direction) over a given X-Y area. It should be understood that the system can be configured to adjust focus as needed during image acquisition. The controller 30 can also be configured to generate a focus map as shown by block 118 (FIG. 5a). FIG. 7 shows a typical view of a specimen 82 with a plurality of capture areas or tiles 502. In general, the size of the capture area depends on size of the image sensor and the optical magnification used. The controller 30 can be configured to divide the scan area can into a plurality of focus zones 504, 506, 508, 510 as shown in FIG. 7. In this example, the focus zones are generally rectangular (e.g., containing 2×3 tiles each). It should be understood that each of the focus zones can be a regular or irregular shape. It is also understood that the controller can be configured to generate focus zones that are appropriately shaped for use with a two-dimensional image sensor or a line scanner.

The controller 30 can store a focus map that defines the focal depth for each focus zone 504, 506, 508, 510. A focus map is typically generated by acquiring one or more images 514, 516, 518, 520 from each focus zone. Controller 30 can be configured to automatically determine the optimal focal depth for each sample image (e.g., by adjusting the focus until a maximum contrast is obtained). It should be understood that a wide variety of auto focusing/focal map generation techniques can be used without departing from the scope of this disclosure.

Continuing with FIG. 5a, the controller 30 can acquire images from the desired scan area (e.g. multiple X-Y locations) as shown by block 120. As discussed above, depending on the type of image sensor used, the controller 30 can acquire images as individual tiles (e.g., two-dimensional image sensor) or in strips (e.g., line scanner or TDI image sensor). Individual scan images can be overlapping or non-overlapping. The acquired images can be saved individually or can be combined assembled into a composite image file. Such image files can be saved in a variety of formats (e.g., flat file, Tiff, Big TIFF file, Jpeg, Bmp, tiled data structure . . . ) with or without image compression. If overlapping images are acquired, the controller 30 can be configured to assemble the images into a seamless overall image. The controller 30 can also be configured to save coordinating information. The coordinating information can be saved along with the acquired images in a data structure or virtual slide file. In the alternative, the system can construct a composite image composed of multiple smaller images as shown by block 122. Once the desired image data is acquired, the bright field illuminator 40 can be turned off (e.g., de-energized, shuttered or blocked) as shown by block 124.

The controller 30 is also configured to initiate image acquisition using dark field illumination as shown by block 210. The controller 30 can adjust the condenser 34 to minimize light leakage along light path 32. This can be accomplished by closing the aperture 38 and/or pivoting the condenser 34 (or the condenser top lens) away from light path 34 as shown by block 212. Controller 30 can select the desired magnification as shown by block 214 (e.g., select an objective lens 50 with desired magnification). The controller 30 is also configured to energize the dark field illuminator 60 as shown by block 216. The controller 30 can also adjust the dark field illumination level depending on the desired light level.

The controller 30 can be configured to generate a focus map as shown by block 218. The controller 30 can then acquire images from the desired scan area (e.g. multiple X-Y locations) as shown by block 220. Depending on the type of image sensor used, the controller 30 can acquire images as individual tiles (e.g., two-dimensional image sensor) or in strips (e.g., line scanner or TDI image sensor) as discussed above. The controller 30 is configured to save the image information as shown by block 222 as discussed above in connection with block 122. Once the controller 30 acquires the desired image data, the dark field illuminator 60 can be de-energized as shown by block 224.

The controller 30 is also configured initiate image acquisition using the fluorescent illuminator 70 as shown by block 310. The controller 30 can adjust the condenser 34 to minimize light leakage along light path 32 as shown by block 212. This can be accomplished as discussed above. Controller 30 can select the desired magnification as shown by block 314 (e.g., select an objective lens 50 with desired magnification). The controller 30 is also configured to energize the fluorescent illuminator 70 as shown by block 316. The controller 30 can configure any filters 72 (emission and/or excitation), dichromatic mirrors 74, open any shutters and adjust the illumination level depending on the desired light level.

Wide field microscopic imaging using fluorescent illumination can present some difficulty. When fluorescent dye is exposed to excitation light, the sample photobleaches and the fluorescent signal from the sample can be dramatically reduced. This can be exacerbated by the time it takes to generate a focus map. Controller 30 is configured to store a previously generated dark field focus map for a given specimen and use the dark field focus map when acquiring images using the fluorescent illuminator 70. This is shown by block 318. In the alternative (e.g., if a dark field focus map is not available) the controller 30 can use real time focusing or generate a focus map using fluorescent illumination. It should be understood that the controller 30 need not save images (e.g., block 222) while generating the dark field focus map. Instead, the controller 30 can simply generate the dark field focus map prior to entering fluorescence mode and immediately switch to fluorescence mode to acquire images using the fluorescent illuminator 70 using the dark field focus map.

The controller 30 can then acquire images from the desired scan area (e.g. multiple X-Y locations) as shown by block 320. Depending on the type of image sensor used, the controller 30 can acquire images as individual tiles (e.g., two dimensional image sensor) or in strips (e.g., line scanner or TDI image sensor) as discussed above. The controller 30 is configured to save the image information as shown by block 322 as discussed above in connection with block 122. Once the controller 30 acquires the desired image data, the fluorescent illuminator 70 can be shuttered or blocked as shown by block 324. After all fluorescent images are acquired, the fluorescent illuminator 70 can be de-energized. The controller 30 is configured to return the slide 24 to the cassette 26 as shown by block 326.

It should be understood that controller 30 can be configured to switch between two or more different illuminators during image acquisition (e.g., after acquisition of a lane or capture area). Returning to FIGS. 9a and 9b for example, a system configured with a line scanner or TDI image sensor can scan lane Y11 with one illuminator (e.g., the dark field illuminator 60) and then scan Y11 again with a different illuminator (e.g., fluorescent illuminator 70) before moving in the Y direction. In the alternative, the system can scan multiple lanes (e.g., lanes Y11-Y15) with one illuminator before switching to another illuminator as discussed above).

Similarly, a system configured with a two dimensional image sensor can switch between two or more different illuminators after acquisition of a capture area. Returning to FIG. 10 for example, the system can acquire an image of capture area 1,1 with one illuminator (e.g., the dark field illuminator 60) and then acquire an image of capture area 1,1 again with a different illuminator (e.g., fluorescent illuminator 70) before moving in the X-Y direction. In the alternative, the system can scan multiple capture areas or an entire scan area with one illuminator before switching to another illuminator (as discussed above in connection with FIG. 5a).

FIGS. 5b/5c are a flow chart showing operation of a system using multiple illuminators before moving to another lane or acquisition area. This configuration can reduce the number of stage movements, reduce the vibration problems and also reduce the scanning time. The basic acquisition conditions are selected as shown in block 800. Basic acquisition conditions typically include the scan magnification(s), type of illumination, focus options and the like. Such conditions can be set via a user interface (See 402, FIG. 6). Once the basic acquisition conditions are set, the controller 30 can operate the slide loader 22 and retrieve a slide 24 from the cassette 26 as shown by block 802. The slide 24 is placed on the stage 28 as shown by block 804.

In this example, an optional macro scan (macro image acquisition) is performed as shown by block 806. A macro image can be used in connection with automatic determination of the scan area (e.g., the areas containing specimen). The macro scan can be performed using a separate macro camera and can optionally image the entire microscope slide including any bar code information. Such image information can be stored for future use. The various illuminators 40, 60, 70 can be configured as shown in block 810. Blocks 812-824 illustrate the type of parameters that can be configured in order to configure the various illuminators 40, 60, 70. It should be understood that the system configuration tasks in blocks 800-824 can be performed in a variety of sequences without departing from the scope of this disclosure. Block 812-824 generally show an example in which bright field illuminator 40, dark field illuminator 60 and fluorescent illuminator 70 (with multiple configurations) are used. It should be understood that the system can be generally configured to use any number of illuminators without departing from the scope of this disclosure. Typically, two or more different illuminators will be used.

The bright field illumination conditions (e.g., acquisition time, illumination energy) configured as shown by block 814. The bright field condenser position and aperture stop is configured as shown by block 816. The dark field illumination conditions (e.g., acquisition time, illumination energy) are configured as shown by block 818. Blocks 820-824 illustrate the setup of several fluorescence configurations (e.g., multiple fluorochromes). In this example, three fluorescence configurations are illustrated. Each fluorescence configuration may use different illumination conditions (e.g., acquisition time, illumination energy) excitation and emission filter configurations, dichroic mirror configuration and the like. FIGS. 5b/5c show the use of three fluorescent configurations for use with thee different stains such as 4'-6-Diamidino-2-phenylindole (DAPI), Fluorescein isothiocyanate (FITC) and Cyanine (Cy3, Cy5). It should be understood that any fluorescent stain can be used without departing from the scope of this disclosure.

A focus map can be generated as shown by block 812. It should be understood that use of a focus map is optional. It is possible to generate a focus map using bright field, dark field or fluorescent illuminators. As discussed above, controller 30 can be configured to store a previously generated dark field focus map for a given specimen and use the dark field focus map when acquiring images using the fluorescent illuminator.

The system is now configured for image acquisition. Controller 30 can position the specimen and energize the first illuminator. In this example, the bright field illuminator 40 is energized as shown by block 830. The controller can acquire an image of capture area 1,1 using the bright field illuminator 40 as shown by block 832. Controller 30 can now use a second illuminator (the first illuminator is shuttered, blocked or de-energized and the next illuminator is energized). In this example, the dark field illuminator 60 is energized as shown by block 834. The controller can acquire an image of capture area 1,1 using dark field illuminator 60 as shown by block 836.

Image acquisition using the fluorescent illuminator 70 is illustrated by blocks 838-848. In this example, controller 30 can configure fluorescent illuminator 70 using fluorescence configuration 1 as shown by block 838. The controller can acquire an image of capture area 1,1 using fluorescence configuration 1 as shown by block 840. Controller 30 can configure and energize fluorescent illuminator 70 using fluorescence configuration 2 as shown by block 842. Controller 30 can acquire an image of capture area 1,1 using fluorescence configuration 2 as shown by block 844. Controller 30 can configure and energize fluorescent illuminator 70 using fluorescence configuration 3 as shown by block 846. Controller 30 can acquire an image of capture area 1,1 using fluorescence configuration 3 as shown by block 848. Blocks 850-868 illustrate the same process however, the controller acquires images of capture area 1,2. This process is repeated until images of all capture area areas are acquired as shown by block 870. The acquired images can be saved in a variety of formats as discuss above.

Figure 6:
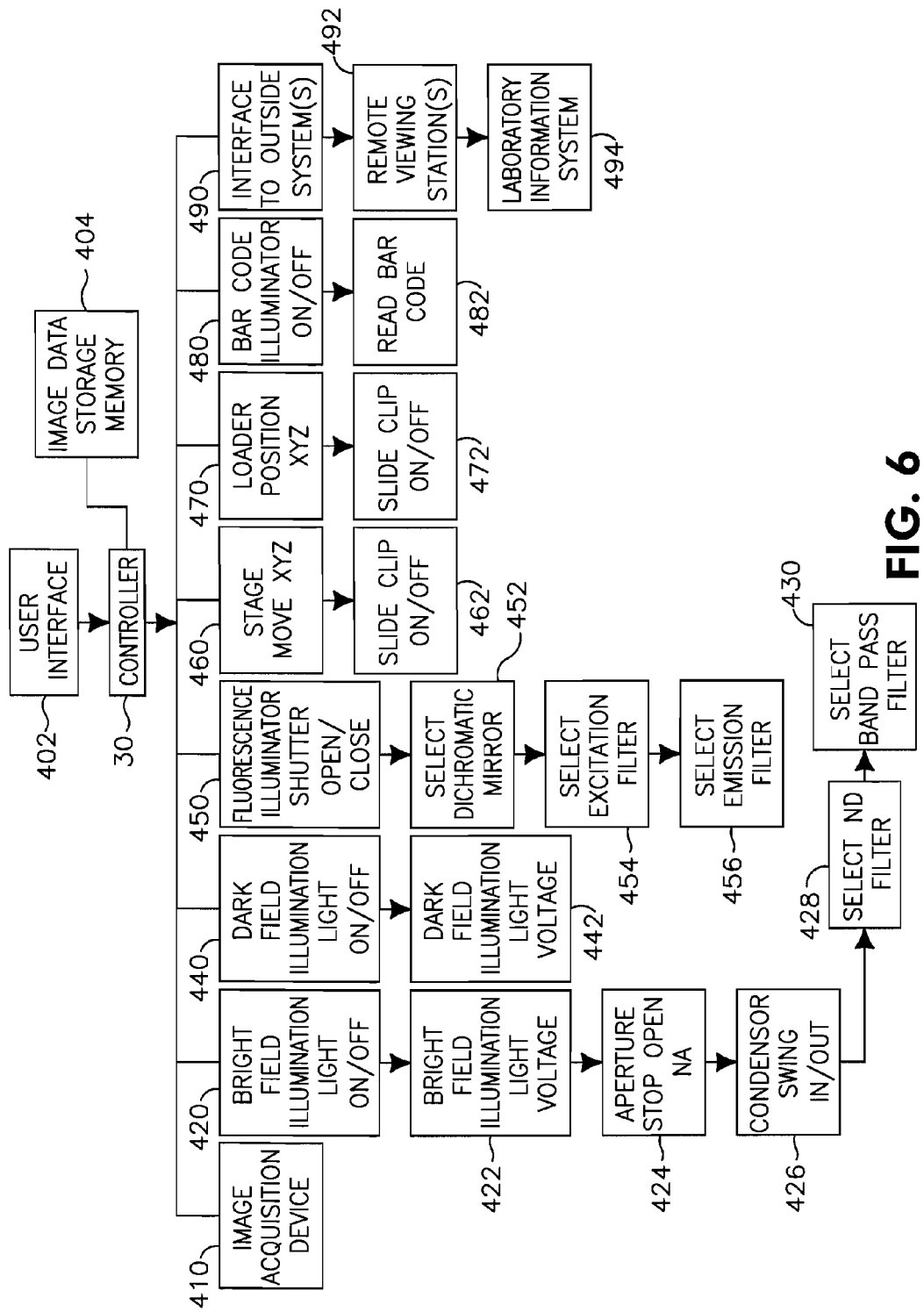
FIG. 6 is a block diagram showing the functions handled by the controller.

FIG. 6 shows a block diagram detailing the functions handled by the controller 30. The controller 30 can be implemented using variety of hardware and software. In a typical system, the controller 30 is a based on a typical personal computer. The controller 30 has a microprocessor, high-speed memory (e.g., RAM, ROM), storage memory (e.g., hard disk, CD, DVD), input output devices (e.g., keyboard, mouse, display) and a variety of interfaces (parallel, serial, optical. . .). The controller 30 typically also has an operating system and one or more programs that control the operation of the system. A user interface 402 is provided. The user interface 402 allows for user interaction with the system. For example, the user may be used to set acquisition conditions such as the scan magnification(s), illumination type (e.g., one or more of bright field, dark field, fluorescent), focus options, scan area and the like. The user interface 402 may also allow for viewing of specimens during scanning and viewing of previously stored WSI data. Controller 30 is shown in drawings as a single logical block. It should be understood that controller 30 can be implemented using a plurality of physical devices each having one or more processors and/or interfaces. Such devices can be interconnected via various techniques that are well known in the art. For example, it may be advantageous to have separate devices configured to control various aspects (e.g., focus, stage movement, illumination, image acquisition and the like). Use of such separate devices is encompassed by the term controller and the disclosure contained herein.

The controller 30 is electrically coupled to the image acquisition device via an appropriate interface (e.g., universal serial bus (USB), IEEE 1394 (Firewire), Ethernet, Cameralink . . . ) as shown by block 410. The controller 30 is generally configured to coordinate image acquisition and stage movement to acquire the desired image data. As discussed above, images can be acquired in an X-Y fashion or in strips. Acquired images can be non-overlapping or overlapping. In general the controller 30 is configured to generate one or more output file(s) containing image data and/or other data associated with a given specimen as discuss in more detail below. It should be understood that images can be stored in variety of locations including storage memory 404. Images can be stored in a variety of formats as discussed in more detail below.

The controller 30 is also configured to control bright field image acquisition. The controller 30 is electrically coupled to the bright field illuminator 40 (FIG. 1) and can energize and de-energize the bright field illuminator 40 as shown by block 420. The controller 30 can also vary the intensity as needed as shown by block 422. The controller 30 can also vary the condenser 34 aperture stop and change the condenser alignment as shown by blocks 424 and 426. The controller 30 can also select and de-select various filters as needed such as a neutral density (ND) filter or band pass filter as shown by blocks 428 and 430.

The controller 30 is also configured to control dark field image acquisition. The controller 30 is electrically coupled to the dark field illuminator 60 and can energize and de-energize the light source 60 as shown by block 440. The controller 30 can also vary the dark field illuminator 60 intensity as needed as shown by block 442.

The controller 30 is also configured to control fluorescent image acquisition. The controller 30 is electrically coupled to the fluorescent illuminator 70 and can energize and de-energize the fluorescent illuminator 70 and control the shutter as shown by block 450. The controller 30 can also vary the fluorescent illuminator 70 intensity as needed. The controller 30 can also select and control the position of control one or more dichroic mirrors as shown by block 452. The controller 30 can also select and de-select various filters as needed such as excitation filters and emission filters as shown by blocks 454 and 456.

The controller 30 is configured to control the stage 28 as shown by block 460. The controller 30 can be further configured to control any slide clips as shown by block 462. The controller 30 is further configured to control the slide loader 22 and to control any slide clips associated with the storage cassette 26 as shown by blocks 470 and 472. The controller 30 can be configured to control a bar code illuminator and can capture bar code images as shown by blocks 480 and 482.

The controller 30 can store data associated with any of the functions discussed above. Such information can be transferred to outside systems via on or more interfaces (e.g., network interfaces, parallel or serial interfaces, wired or wireless . . . ) as shown by block 490. Such external systems include remote viewing stations (block 492), laboratory information systems (block 494) and the like.

Figure 8:
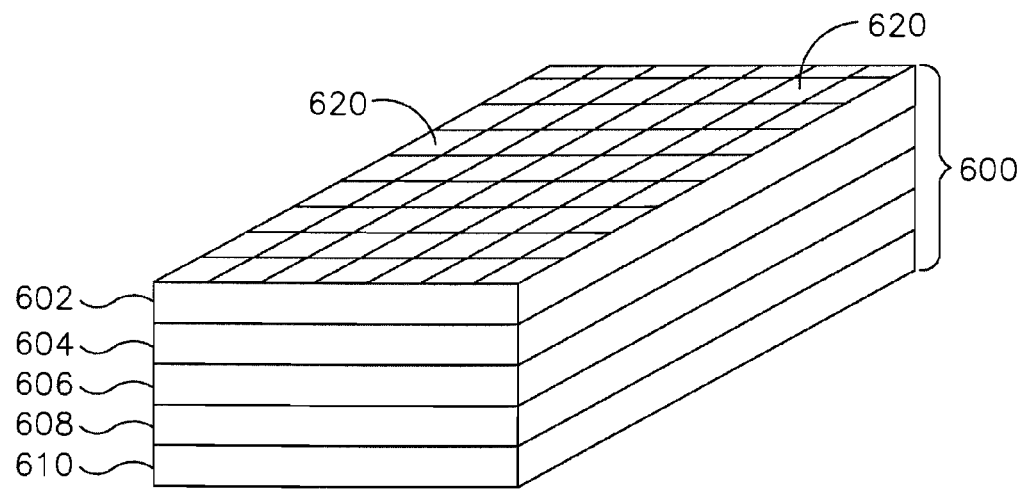
FIG. 8 shows a sample data structure.

As discussed above, image data can be stored in a variety of formats including individual image files or a composite image file (with or without compression) as well as a data structure (including a tiled data structure). FIG. 8 shows a sample data structure 600. One or more viewing stations 492 can be configured to view image data from the data structure 600 as discussed above. In this example, the image data is stored in several layers 602, 604, 606, 608, and 610. Each layer is composed of a series of tiles 620. Tiles 620 are typically stored as non-overlapping tiles to simplify construction of a composite image from a plurality of tiles 620. Each tile 620 may correspond to a capture area 502 (e.g., microscope field of view). In the event that overlapping images are acquired, the controller 30 will typically stitch the tiles together (e.g., using correlation) to eliminate overlapping data. The controller 30 may create an overall image from which non-overlapping tiles 620 are derived. In this case, each tile 620 can contain data and can have dimensions that do not directly correspond to a capture area 502. For example, it may be desirable to capture images having a specific capture size but store tiled images of that are of a different shape or size. It should be understood that controller 30 can be configured to manipulate the acquired image data, format and store tiles as needed for the desired image format.

Each layer can be derived from a single scan or from multiple scans of the specimen 82. For example, layers 602-610 can be bright filed scans of the specimen 82 at different magnifications. Such scans can be obtained by acquiring sets of images at each magnification (e.g., changing objective lenses 50 as need). In the alternative, layers 602-610 can be down-sampled (e.g., 20×, 10×, 5×, 1.25×) from a single, high-magnification scan (e.g., 40×).

Each layer 602-610 can also contain image data of the specimen 82 illuminated using any one of the different light sources (e.g., bright field, dark field, fluorescent). Some layers can also contain data from different focal planes in order to support a focus function. Data structure 600 can also contain additional including bar code data, coordinating information (e.g., to facilitate construction of a composite image from two or more tiles 620), annotations and the like. Data structure can be constructed using a proprietary format or can be based on available image formats as discussed above.

Figure 11A:
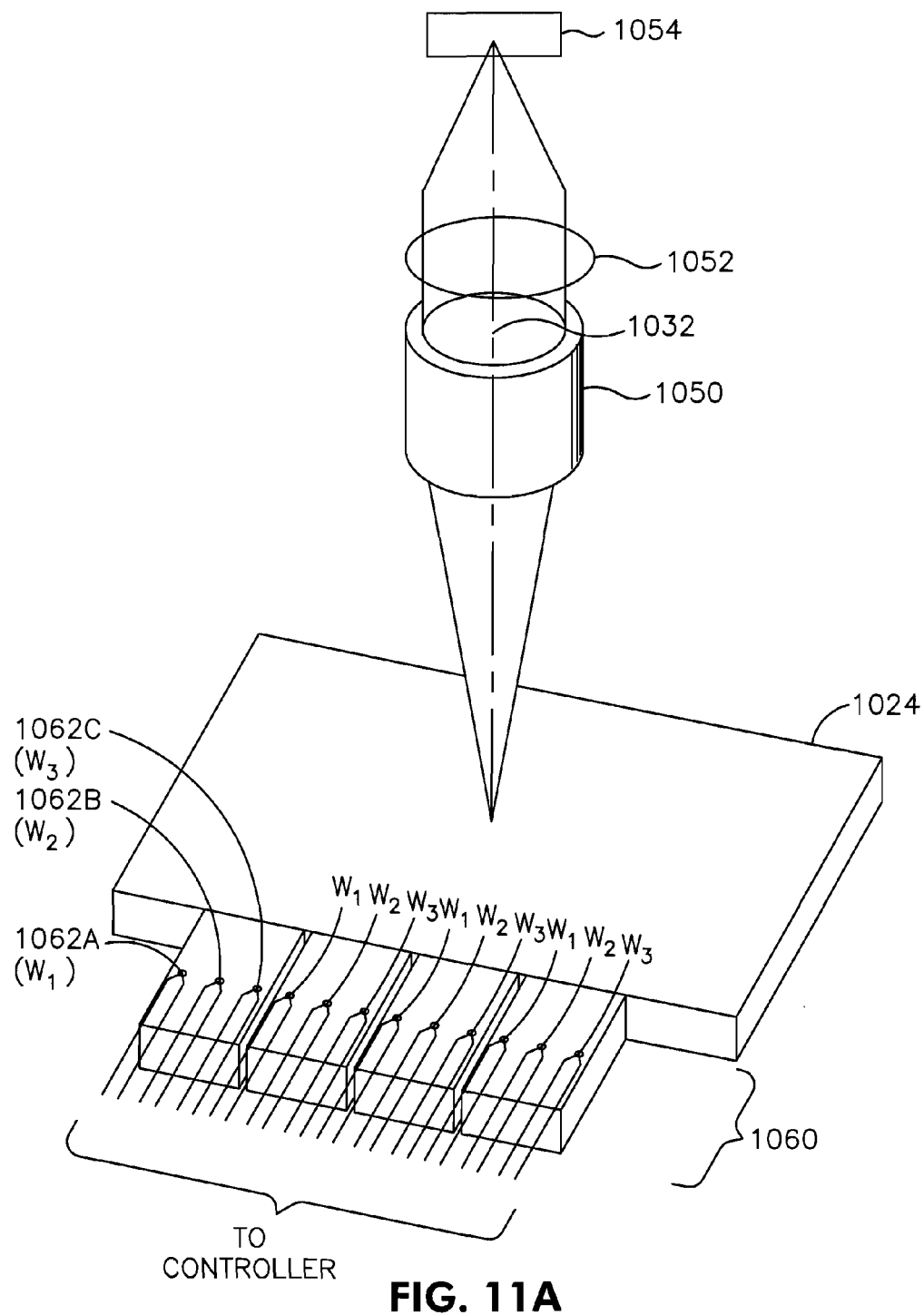
FIG. 11a is a block diagram of an alternate dark field illuminator configuration.

FIG. 11*a* shows another configuration for the dark field illuminator 1060. An objective lens 1050 is disposed above the slide 1024. It should be understood that the objective lens 1050 is generally coupled to a focusing mechanism (not shown) to move the objective lens 1050 with respect to the slide 1024. A lens 1052 can also be disposed along light path 1032. An imaging device 1054 as discussed above is also disposed along light path 1032.

The dark field illuminator is generally shown by reference number 1060. As discussed above in connection with FIG. 11*a*, the dark field illuminator 1060 can be mechanically coupled to the stage so that it remains in a fixed relationship with respect to the slide 1024. The dark field illuminator 1060 can be composed a plurality of individual light sources (e.g., 1062*a*, 1062*b*, 1062*c*) configured to direct light into the side of the slide 1024. In this example, the light sources 1062*a*, 1062*b*, 1062*c* are light emitting diodes (LED) and each has a specific wavelength or spectral output (w1, w2, w3 . . . wn). In one example, light sources 1062*a*, 1062*b*, and 1062*c* can be configured as red, green and blue light sources. The controller can be configured to control the intensity of each LED so that the resulting light produced from the three light sources when directed into the slide can span a wide range of colors or may approximate white light. In this example, four groups of LEDs 1062*a*, 1062*b*, and 1062*c* are disposed along the edge of the slide 1024. It should be understood that the spacing, spectral outputs and number of light sources can be varied without departing from the scope of this disclosure.

Figure 11B:
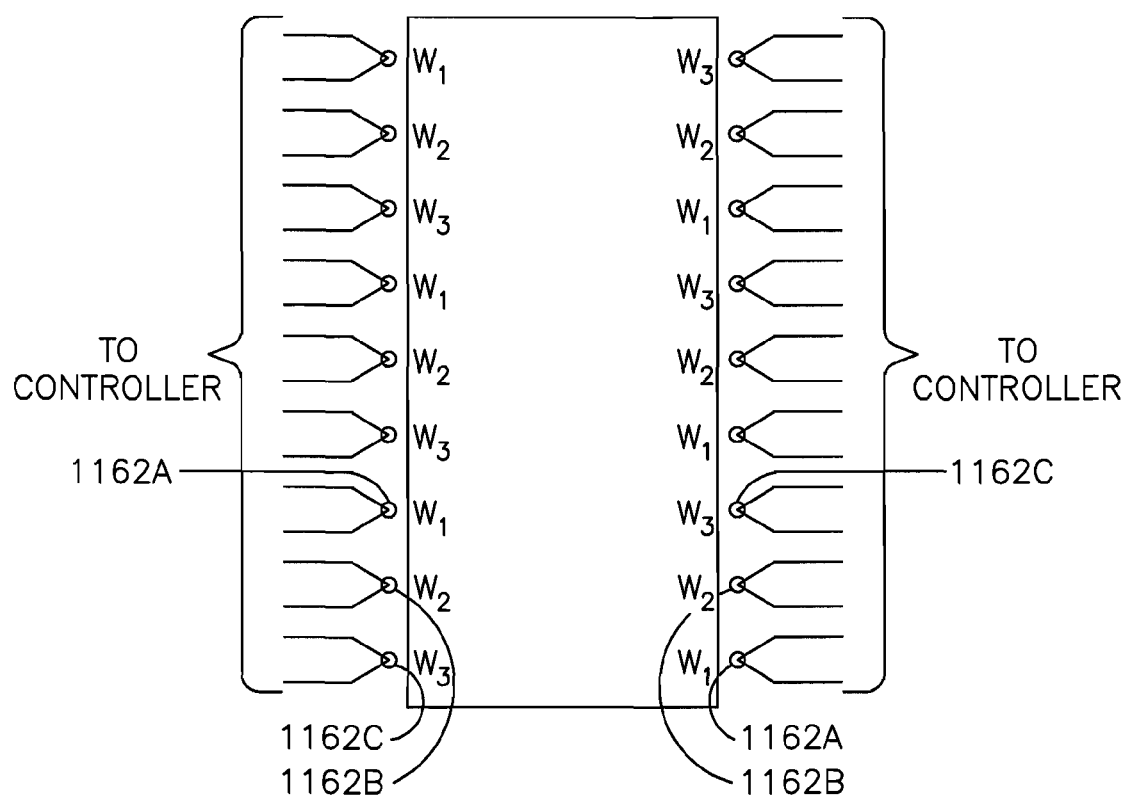
FIG. 11b is a block diagram of a dark field illuminator configuration where additional light sources are optionally disposed along other sides of a slide.

The dark field illuminator 1060 can also be used as a fluorescent illuminator. For example, the wavelengths or spectral outputs of one or more of the light sources 1062*a*, 1062*b*, and 1062*c* can be selected such that they provide the desired wavelength(s) of light for fluorescent illumination. In the alternative, the controller can energize two or more of the light sources 1062*a*, 1062*b*, and 1062*c* so that the resulting combination of light results in the desired spectral output of light. FIG. 11*b* shows a configuration where additional light sources 1162*a*, 1162*b* and 1162*c* are optionally disposed along another side of slide 1124 as shown. Such a configuration can improve dark field illumination since light is directed into the slide from additional angles.

Figure 12A:
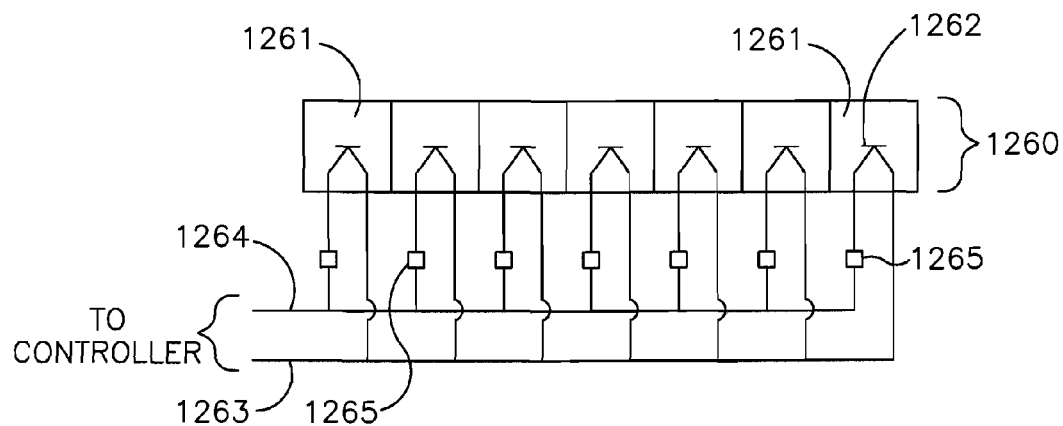
FIG. 12a is a block diagram showing another dark field illuminator configuration.

FIG. 12*a* shows yet another configuration for the dark field illuminator 1260. In this example each individual light source 1262 is an LED housed in a mounting unit 1261 configured to hold the light source in the desired orientation. Suitable LEDs can include LEDs housed in traditional packages as well as unpackaged dies. Suitable unpackaged LEDs can be obtained from a variety of sources including Nichia Corporation (www.nichia.com), Philips Lumileds Lighting Company (http://www.philipslumileds.com) and CREE, Inc. (http://www.cree.com/). The mounting unit 1261 can be formed of a variety of materials including transparent or translucent plastic. The mounting unit 1261 can at least partially surround the light source 1262. Each light source 1262 has lead wires 1263 that can optionally be coupled to a current dropping resistor 1265 as needed depending on the voltage source.

Figure 12B:
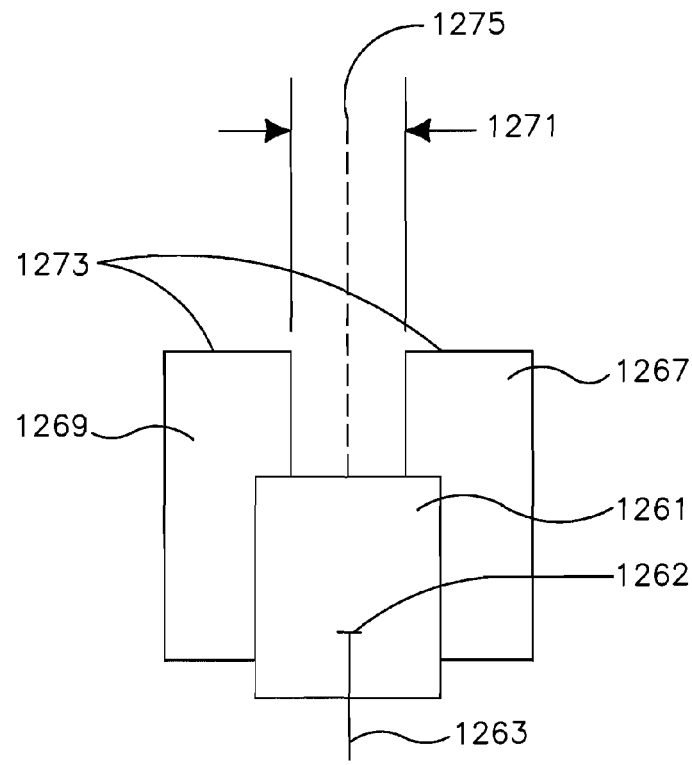
FIG. 12b is a block diagram showing a side view of a dark field illuminator configuration that includes a light guide.

FIG. 12*b* shows a side view of a dark field illuminator assembly that includes a light guide 1273 which includes upper and lower portions 1267 and 1269. 1271. The light guide 1273 can be made of opaque material such that light from the The light guide is generally configured with a slit aperture 1270 having a thickness individual light sources 1262 is collimated or generally directed along path 1275. In general, the dark field illuminator is oriented such that the light path 1275 is directed into the edge of the microscope slide (as shown in FIGS. 2, 4 and 11*a*). In this example, the dimensions of slit 1271 range from 0.8-1.5 mm (the thickness of a typical microscope slide). It should be understood that slit 1271 can be dimensioned based on other optical parameters. The slit can be left open or can be filled with a transparent or translucent material. It should also be understood that dark field illuminator 1260 can be configured with a variety of light sources having different wavelengths or spectral outputs and that dark field illuminator 1260 can also be configured to function as a fluorescent illuminator as discussed above.

Figure 12C:
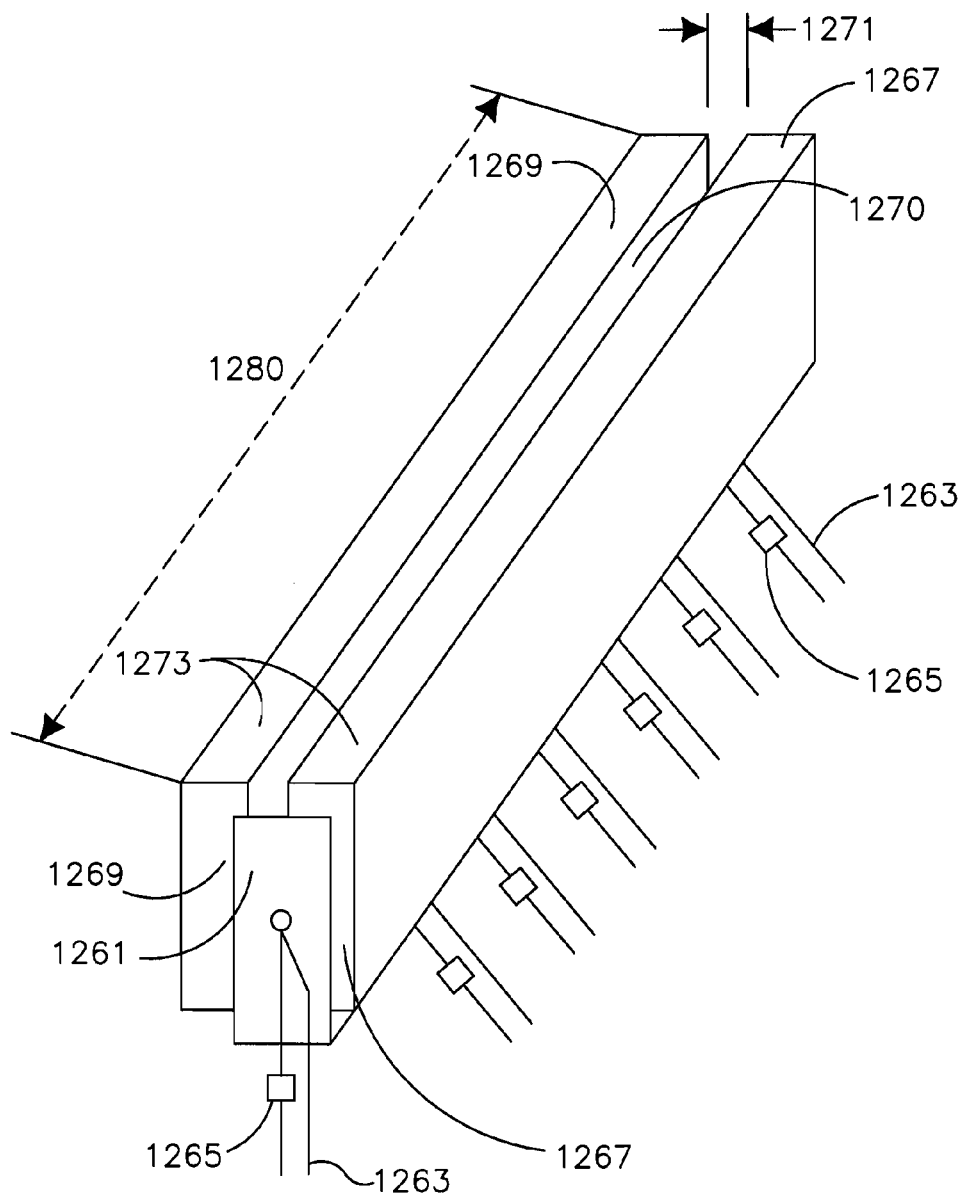
FIG. 12c shows a pictorial view of the light guide.

FIG. 12*c* shows a pictorial view of light guide 1273. In this example, the light guide 1273 covers the upper and lower surfaces 1267 and 1269 of all mounting units 1261. Light guide 1273 can have a length 1280 that generally extends the length of a typical microscope slide. In general, the light guide directs the light from light sources 1262 along light path 1275 and reduces light leakage along other paths. This configuration can provide improved performance of LEDs generally lacking a traditional package (e.g., naked dies). This configuration can provide improved imagery when used with all LED package types because stray light is minimized.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include non-transitory devices such as read only memory (ROM), random access memory (RAM), registers, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions (such instructions capable of being stored on a computer readable media). The results of such processing may be maskworks that are then used in a semiconductor manufacturing process to manufacture a processor which implements aspects of the present invention.

What is claimed is:

1. A wide field microscopic image acquisition apparatus for acquiring images of a specimen on a microscope slide, the apparatus comprising:
   first and second illuminators each having unique illumination characteristics;
   a microscope imaging system including an imaging device, an objective lens and a stage configured to digitally acquire a plurality of images of the specimen using the first and second illuminators; and
   a controller configured to automatically control the microscope imaging system and scan the specimen on the microscope slide to acquire the plurality of images from a scan area of the specimen using the first and second illuminators;
   wherein the microscope slide defines a first side of the microscope slide facing to the objective lens and a second side of the slide perpendicular to the first side;
   the first illuminator comprises a dark field illuminator configured to direct light into the second side of the microscope slide;
   the second illuminator comprises a fluorescent illuminator; and
   the controller is configured to acquire a first set of images of the scan area using the dark field illuminator, generate a dark field focus map defining a focal depth for each of the images within the first set of images, store the dark field focus map and acquire a second set images of the scan area using the fluorescent illuminator based on the stored dark field focus map.

2. The apparatus of claim 1, wherein the controller is configured to acquire images of the specimen using the first illuminator and the second illuminator prior to moving the specimen in an X-Y direction with respect to the objective lens.

3. The apparatus of claim 1, further comprising a condenser, wherein the imaging device and objective lens have a light path and the controller is configured to adjust the condenser to minimize light transmitted along the light path.

4. The apparatus of claim 3, wherein the condenser has a pivot and the controller is configured to move the condenser via the pivot to minimize light transmitted along the light path.

5. The apparatus of claim 1, wherein the controller is configured to digitally acquire a plurality of Z images of the specimen.

6. The apparatus of claim 1, wherein the controller is configured to acquire a plurality of images of the specimen at multiple magnifications.

7. The apparatus of claim 1, wherein the controller is configured to save a data structure of images of the specimen.

8. The apparatus of claim 1, wherein the first illuminator comprises a first light source having a first spectral output and a second light source having a second spectral output, the first and second light sources directing light into the second side of the microscope slide.

9. The apparatus of claim 1, wherein the first and second light sources are configured to direct light into the same side of the microscope slide.

10. The apparatus of claim 1, wherein the first illuminator comprises a light guide configured to collimate light originating from the dark field illuminator.

11. The apparatus of claim 10, wherein the first illuminator comprises a plurality of individual light sources arranged in array and the light guide is formed with upper and lower portions, configured to collimate light originating from the individual light sources.

12. The apparatus of claim 1, wherein the first illuminator comprises a plurality of individual light sources arranged in array, wherein the individual light sources are configured to be selectively energized.

13. The apparatus of claim 1, wherein the first illuminator comprises a plurality mounting units configured to hold a plurality of unpackaged individual light sources.

14. A method of acquiring wide field microscopic images of a specimen on a microscope slide, the method comprising:
- providing first and second illuminators each having unique illumination characteristics;
- providing a microscope imaging system including an imaging device, an objective lens and a stage configured to digitally acquire a plurality of images from a scan area of the specimen using the first and second illuminators; and
- providing a controller configured to automatically control the microscope imaging system and scan the specimen on the microscope slide to acquire the plurality of images from the scan area using the first and second illuminators;
- wherein the microscope slide defines a first side of the microscope slide facing to the objective lens and a second side of the slide perpendicular to the first side;
- the first illuminator comprises a dark field illuminator that directs light into the second side of the microscope slide;
- the second illuminator comprises a fluorescent illuminator; and
- the controller is configured to acquire a first set of images of the scan area using the dark field illuminator, generate a dark field focus map defining a focal depth for each of the images within the first set of images, store the dark field focus map and acquire a second set images of the scan area using the fluorescent illuminator based on the stored dark field focus map.

15. The method of claim 14, wherein the controller is configured to acquire a plurality of X-Y images of the specimen using the first illuminator and the second illuminator prior to switching to the second illuminator.

16. The method of claim 14, wherein the controller is configured to acquire images of the specimen using the first illuminator prior to moving the specimen in an X-Y direction with respect to the objective lens.

17. The method of claim 14, further comprising providing a condenser, wherein the imaging device and objective lens have a light path and the controller is configured to adjust the condenser to minimize light transmitted along the light path.

18. The method of claim 17, wherein the condenser has a pivot and the controller is configured to move the condenser via the pivot to minimize light transmitted along the light path.

19. The method of claim 14, wherein the controller is configured to acquire a plurality of images of the specimen at multiple magnifications.

20. The method of claim 14, wherein the controller is configured to save a data structure of images of the specimen.

21. The method of claim 14, wherein the first illuminator comprises a first light source having a first spectral output and a second light source having a second spectral output, the first and second light sources directing light into the second side of the microscope slide.

22. The method of claim 21, wherein the first and second light sources are configured to direct light into the same side of the microscope slide.

23. The method of claim 14, wherein the first illuminator comprises a light guide configured to collimate light originating from the dark field illuminator.

24. The method of claim 23, wherein the first illuminator comprises a plurality of individual light sources arranged in array and the light guide is formed with upper and lower portions, configured to collimate light originating from the individual light sources.

25. The method of claim 14, wherein the first illuminator comprises a plurality of individual light sources arranged in array, wherein the individual light sources are configured to be selectively energized.

26. The method of claim 14, wherein the first illuminator comprises a plurality mounting units configured to hold a plurality of unpackaged individual light sources.

27. A wide field microscopic image acquisition apparatus for acquiring images of a specimen on a microscope slide, the apparatus comprising:
- an illuminator configured to direct light into a side of the microscope slide and having a dark field light source with a first spectral output and a second light source with a second spectral output;
- a microscope imaging system including an imaging device and an objective lens and a stage configured to digitally acquire a plurality of images of the specimen; and
- a controller configured to automatically control the microscope imaging system and acquire the plurality of images of the specimen the controller being configured to acquire a first set of images of the scan area using the dark field light source, generate a dark field focus map defining a focal depth for each of the images within the first set of images, store the dark field focus map and acquire a second set images of the scan area using the second light source based on the stored dark field focus map; wherein the microscope slide defines a first side of the microscope slide facing to the objective lens and a second side of the slide perpendicular to the first side; and the dark field and second light sources direct light into the second side of the microscope slide, the controller being configured to acquire a first set of images of the scan area using the dark field light source, generate a dark field focus map defining a focal depth for each of the images within the first set of images, store the dark field focus map and acquire a second set images of the scan area using the second light source based on the stored dark field focus map;
- wherein the microscope slide defines a first side of the microscope slide facing to the objective lens and a second side of the slide perpendicular to the first side; and
- the dark field and second light sources direct light into the second side of the microscope slide.

28. A wide field microscopic image acquisition apparatus for acquiring images of a specimen on a microscope slide, the apparatus comprising:
- an illuminator with a plurality of light sources configured to direct light into a side of the microscope slide;
- a light guide configured to collimate light originating from the plurality of light sources;
- a microscope imaging system including an imaging device and an objective lens and a stage configured to digitally acquire a plurality of images of the specimen; and
- a controller configured to automatically control the microscope imaging system and acquire the plurality of images of the specimen a controller configured to automatically control the microscope imaging system and acquire the plurality of images of the specimen, the controller being configured to acquire a first set of images of the scan area using a dark field light source, generate a dark field focus map defining a focal depth for each of the images within the first set of images, store the dark field focus map and acquire a second set images of the scan area using a second light source based on the stored dark field focus map, the controller being configured to acquire a first set of images of the scan area using a dark field light source, generate a dark field focus map defining a focal depth for each of the images within the first set of images, store the dark field focus map and acquire a second set images of the scan area using a second light source based on the stored dark field focus map;

wherein the microscope slide defines a first side of the microscope slide facing to the objective lens and a second side of the slide perpendicular to the first side; and a plurality of light sources direct light into the second side of the microscope slide.

* * * * *